Feb. 20, 1934.   P. BARBADE   1,948,453

APPARATUS FOR MECHANICALLY PREPARING GLUTEN FROM FLOUR

Filed Jan. 19, 1933   2 Sheets-Sheet 1

PIERRE BARBADE
INVENTOR

BY Haseltine, Lake & Co.
ATTORNEYS

Feb. 20, 1934.   P. BARBADE   1,948,453
APPARATUS FOR MECHANICALLY PREPARING GLUTEN FROM FLOUR
Filed Jan. 19, 1933   2 Sheets-Sheet 2
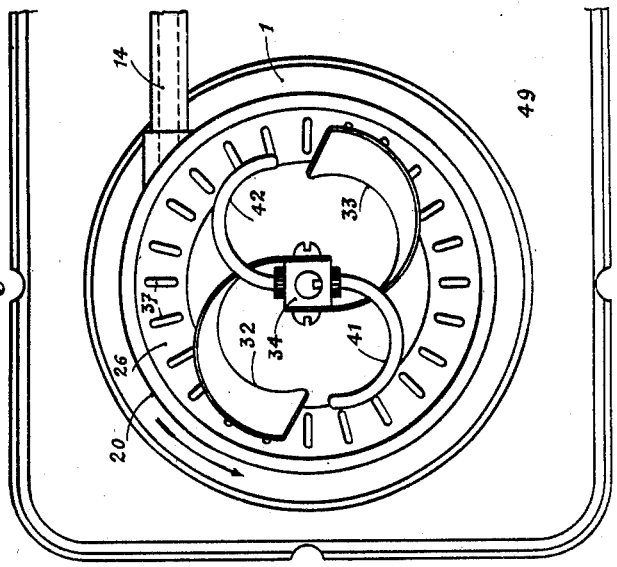
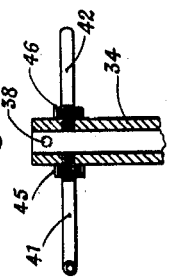
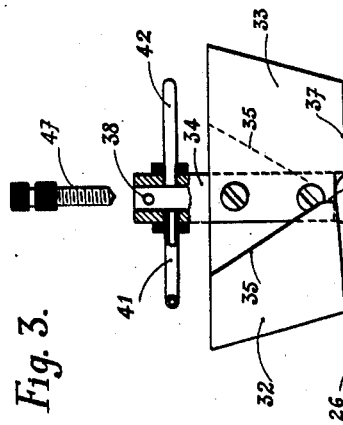
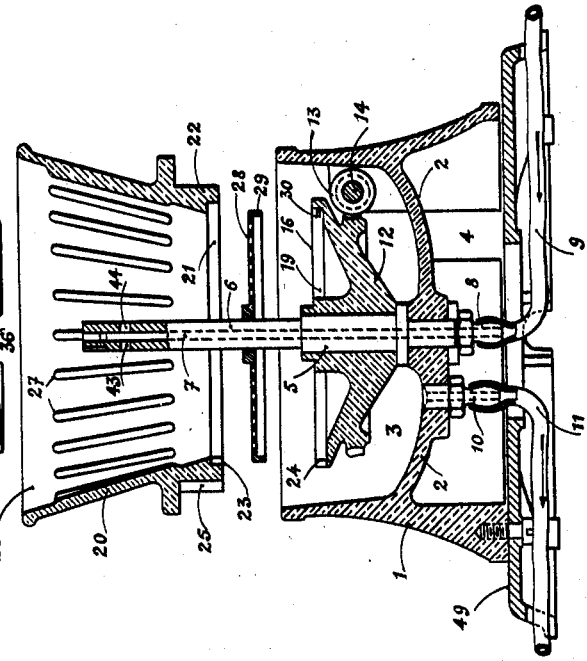
PIERRE BARBADE
INVENTOR.
BY Haseltine Lake & Co.
ATTORNEYS Patented Feb. 20, 1934

1,948,453

UNITED STATES PATENT OFFICE 1,948,453

APPARATUS FOR MECHANICALLY PREPARING GLUTEN FROM FLOUR

Pierre Barbade, Corbeil, France, assignor to Etablissements Tripette & Renaud Fils, Paris, France, a corporation of France Application January 19, 1933, Serial No. 652,517, and in France December 24, 1932

2 Claims. (Cl. 127—24)

This invention relates to apparatus for mechanically preparing gluten from flour, of the kind in which flour in the form of paste is spread over the inner wall of a conical rotary washing trough, kneaded by the action of the rotation of the trough co-operating with stationary wings or blades in said trough, and washed out by water dropping on the paste from stationary tubes placed above the wings.

An apparatus of this kind pertaining to the class of laboratory instruments, it is very important in order that accurate results be obtained, that it can be thoroughly cleaned after each operation of preparing gluten. This possibility of cleaning, which is one object of the present invention, is obtained in assembling the several parts of the apparatus in such manner that they may be easily removed and taken apart for individual cleaning.

Another subject of the invention is to increase the flexibility of the stationary wings, and for this purpose the front edge of each wing is bevelled or cut oblique so as to form a nose at the bottom of each wing, which increases the flexibility at that particular spot.

Another object of the invention is to allow the streams of water delivered from the water tubes of being directed either in the direction of rotation of the washing trough, or in opposite direction thereto. To this end the said water tubes, instead of being rigidly mounted on their support, are screwed therein and held in place by means of lock nuts so that they can be locked in any desired position.

The invention further has for its object some other features which will be described in the following specification with reference to the accompanying drawings of which:

Fig. 3 is a vertical section in a plane at right angle to Figure 1, showing the parts of the apparatus taken apart from each other;

Fig. 4 is a part of Figure 2, showing the water supply tubes in a position different from that shown in Fig. 2;

Fig. 5 shows how the water supply tubes are attached to their support;

Fig. 6 is a detail view showing in which manner the support of the wings is held at proper height on the central shaft of the apparatus.

Figure 1:
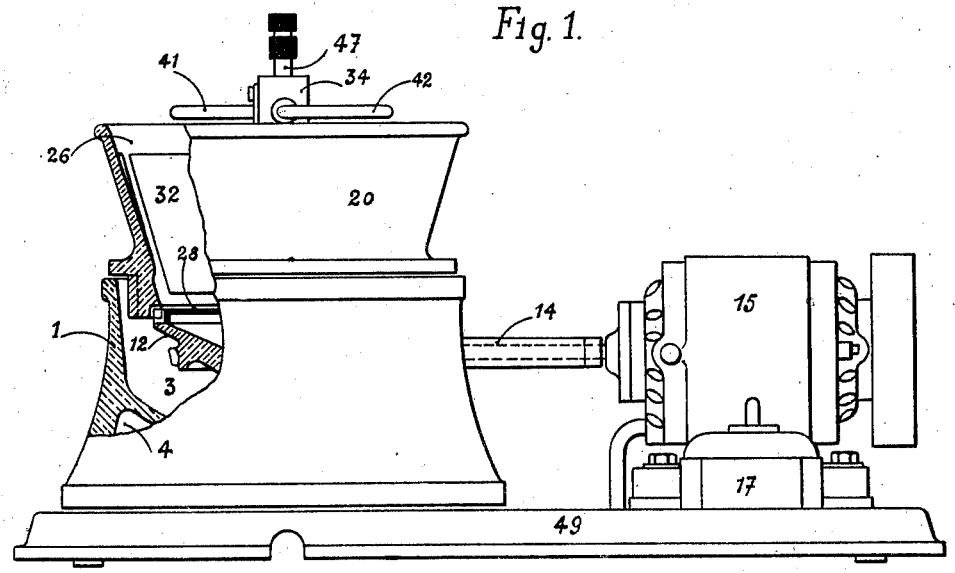
Fig. 1 is a side view of the apparatus, one portion being shown in vertical section.

The apparatus comprises a base 1 of substantially round shape, the inner space of which is divided by a transverse partition 2 into two chambers 3 and 4. From the center of the partition 2 raises a vertical stationary shaft whose portions 5 and 6 above the partition 2 are preferably of different diameter. This shaft has a central channel 7 along its whole length at the lower part of which is a nipple 8 to receive a pipe 9, of rubber or the like, connected to a water supply of any kind.

At a low point of partition 2 a similar nipple 10 on which a drain tube 11, preferably of rubber or the like can be fitted.

In the space or chamber 3 of the base above the partition 2, is a driver, such as a worm wheel 12, loose on the portion 5 of the central shaft and meshing with a worm 13 placed inside the space 3. The worm shaft 14 is driven from an electric motor 15 started and stopped by a switch 17.

The upper face of the worm wheel 12 is recessed so as to form an outer annular flange 18 and an inner recess 19.

20 is the washing trough the lowest face of which is similarly recessed as shown, so as to fit by its recess 21 and flange 22 over the flange 18 of the worm wheel 12. Owing to a stud 23 in the recess 21 of the trough, engaging a notch 24 in the flange 18 said trough is caused to turn with the worm wheel 12. A projection such as 25 (Fig. 3) may be provided at any point of the external surface of the trough 20, for the purpose of operating a speed indicator if desired.

The inner surface of the trough 20 is conical as shown and is preferably provided with narrow ribs 27 projecting slightly from said surface 26. The washing trough 20 has a removable bottom 28 in the form of a screen with very fine holes, fitting in the recess 19 of the wheel 12, said screen turning with the wheel 12 owing to a notch 29 in the edge of the screen, engaging a stud 30 in the recess 19 of the flange 18.

32 and 33 are stationary wings or blades attached at one end to a support 34, square in cross section, slidably mounted on portion 6 of the central shaft; the other end or free end of each wing presses smoothly against the inner conical surface 26 of the washing trough 20. These wings are curved as shown, in such manner that their free end is approximately tangent to the conical surface 26 and they are made of a flexible material or are made thin enough to have a substantial flexibility. The flexibility of the free end is further increased by the fact that the front edge 35 of each wing is bevelled or cut oblique as shown on Figure 3 forming a nose 36 at the lower part of the wing, so that a particular flexibility is obtained at that spot.

Figure 2:
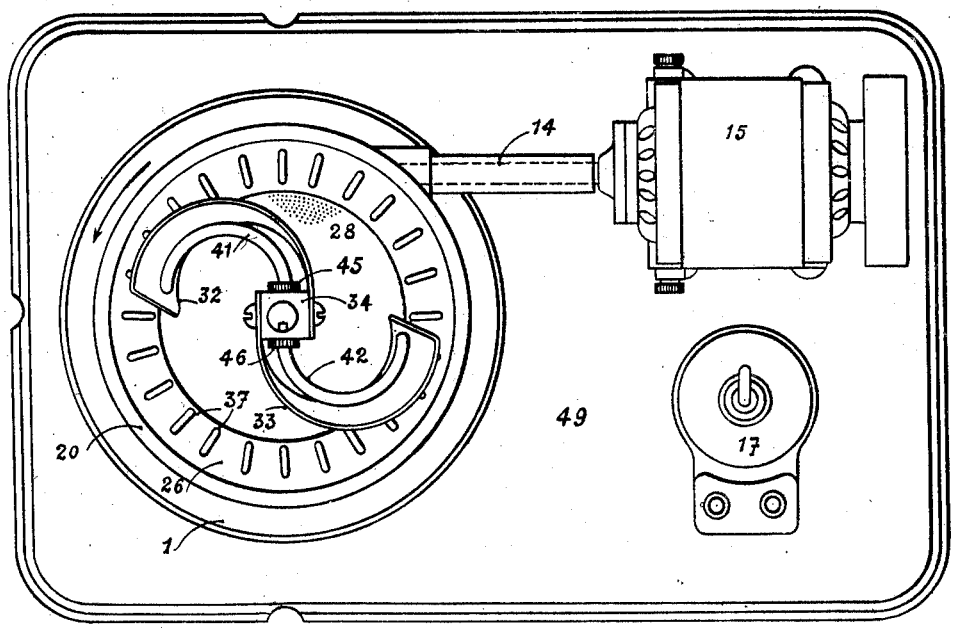
Fig. 2 is a plan view of Fig. 1.

The support 34 of the wings is held at proper height on the portion 6 of the central shaft by a stud 38 projecting into the bore of the support and two grooves 39 and 40 milled at right angle to each other in the portion 6 of the central shaft, the particular object of this arrangement being to prevent the lower edges 37 of the wings of scraping the screen 28 although being placed very close to the screen. The water supply tubes 41 and 42 which show approximately the same curvature as the wings 32 and 33, communicate with the central channel 7 through two holes 43 and 44. They are screwed into the support 34 as shown in Fig. 5 and locked in place by means of lock nuts 45 and 46, which enable them of being locked either in the position shown in Fig. 2 or in the position of Fig. 4 according as it is desired that the stream of water delivered from the tubes flows in the direction of rotation of the vessel 20 or in a direction opposite thereto. The flow of water from the channel 7 to the tubes 41 and 42 can be adjusted by a hand operated pointer screw 47.

From the foregoing description it is seen that the parts of the apparatus can be instantly taken apart without the help of any tool whatever, by merely lifting them away from the shaft or from each other, the worm wheel, screen and trough having no other mutual connection than stud and notch engagement. They can be thoroughly cleaned as well as the space 3 of the base 1.

The apparatus, with motor and switch are mounted on a hollow bed plate 49 through which the rubber pipes 9 and 11 can be passed for attachment to the nipples 8 and 11.

To reverse the position of the water tubes slightly unscrew the lock nuts 45—46, reverse the tubes, then tighten the lock nuts again.

What I claim is:

1. In an apparatus for mechanically preparing gluten from flour, having a revolving washing trough, stationary wings inside said trough, contacting with the inner surface thereof, and stationary water tubes above the wings, the arrangement of a hollow base, a transverse partition in the base and a stationary shaft extending upward from the center of the partition, in combination with a driving member loose on the shaft, a recess and annular flange in the upper face of the driving member, a conical washing trough with recessed lower face supported by the driving member, a removable bottom for the trough fitting in the recess of the driving member, and stud and notch connection between the driving member, the washing trough and the removable bottom thereof.

2. In an apparatus for mechanically preparing gluten from flour, having a revolving washing trough, stationary wings inside said trough, contacting with the inner surface thereof, and stationary water tubes above the wings, the arrangement of a hollow base having a transverse partition and a stationary shaft extending upward from the center of the partition, in combination with a driving member loose on the shaft, means for rotating said driving member, a washing trough supported on the driving member and having a conical inner surface, a removable bottom in the form of a screen supported by the driving member, stud and notch connection between said member and the trough and its bottom, and wings inside the washing trough mounted on a support slidably fitted on the central shaft and having a stud and groove connection with said shaft.

PIERRE BARBADE.